US009842135B2

(12) United States Patent
Saadat et al.

(10) Patent No.: US 9,842,135 B2
(45) Date of Patent: Dec. 12, 2017

(54) METHODS, APPARATUSES AND COMPUTER PROGRAM PRODUCTS FOR PERFORMING INDEX SEARCH OPTIMIZATION

(71) Applicant: HERE Global B.V, Eindhoven (NL)

(72) Inventors: Saied Saadat, Watertown, MA (US); Cristina Ileana Maier, Watertown, MA (US)

(73) Assignee: HERE Global B.V., Eindhoven (NL)

( * ) Notice: Subject to any disclaimer, the term of this patent is extended or adjusted under 35 U.S.C. 154(b) by 197 days.

(21) Appl. No.: 14/202,713

(22) Filed: Mar. 10, 2014

(65) Prior Publication Data

US 2015/0254303 A1    Sep. 10, 2015

(51) Int. Cl.
*G06F 17/00* (2006.01)
*G06F 17/30* (2006.01)

(52) U.S. Cl.
CPC .. *G06F 17/30463* (2013.01); *G06F 17/30321* (2013.01)

(58) Field of Classification Search
CPC ......... G06F 17/30584; G06F 17/30289; G06F 17/30312; G06F 17/30321; G06F 17/30864
See application file for complete search history.

(56) References Cited

U.S. PATENT DOCUMENTS

| | | | |
|---|---|---|---|
| 2010/0036801 A1* | 2/2010 | Pirvali | G06F 17/30448 707/713 |
| 2012/0047164 A1 | 2/2012 | Saadat | 707/769 |
| 2012/0143873 A1 | 6/2012 | Saadat | 707/741 |
| 2012/0296913 A1* | 11/2012 | Ash | G06F 17/30619 707/741 |
| 2014/0067363 A1* | 3/2014 | Ogren | G06F 17/2282 704/2 |

\* cited by examiner

*Primary Examiner* — Truong Vo
(74) *Attorney, Agent, or Firm* — Alston & Bird LLP

(57) ABSTRACT

Performing index search optimization by receiving a search query for a search of an index, wherein the index has been partitioned across a plurality of nodes. This search index optimization may be performed for deterministic as well as non-deterministic queries. In both cases, a local partition is searched and analyzed and a corresponding execution path is selected for optimization. Different optimization strategies are chosen for the two types of queries. For the cases when the partition or the set of partitions containing the required matches can be determined, the request is routed directly to that partition or set of partitions without interrogating other partitions.

22 Claims, 12 Drawing Sheets

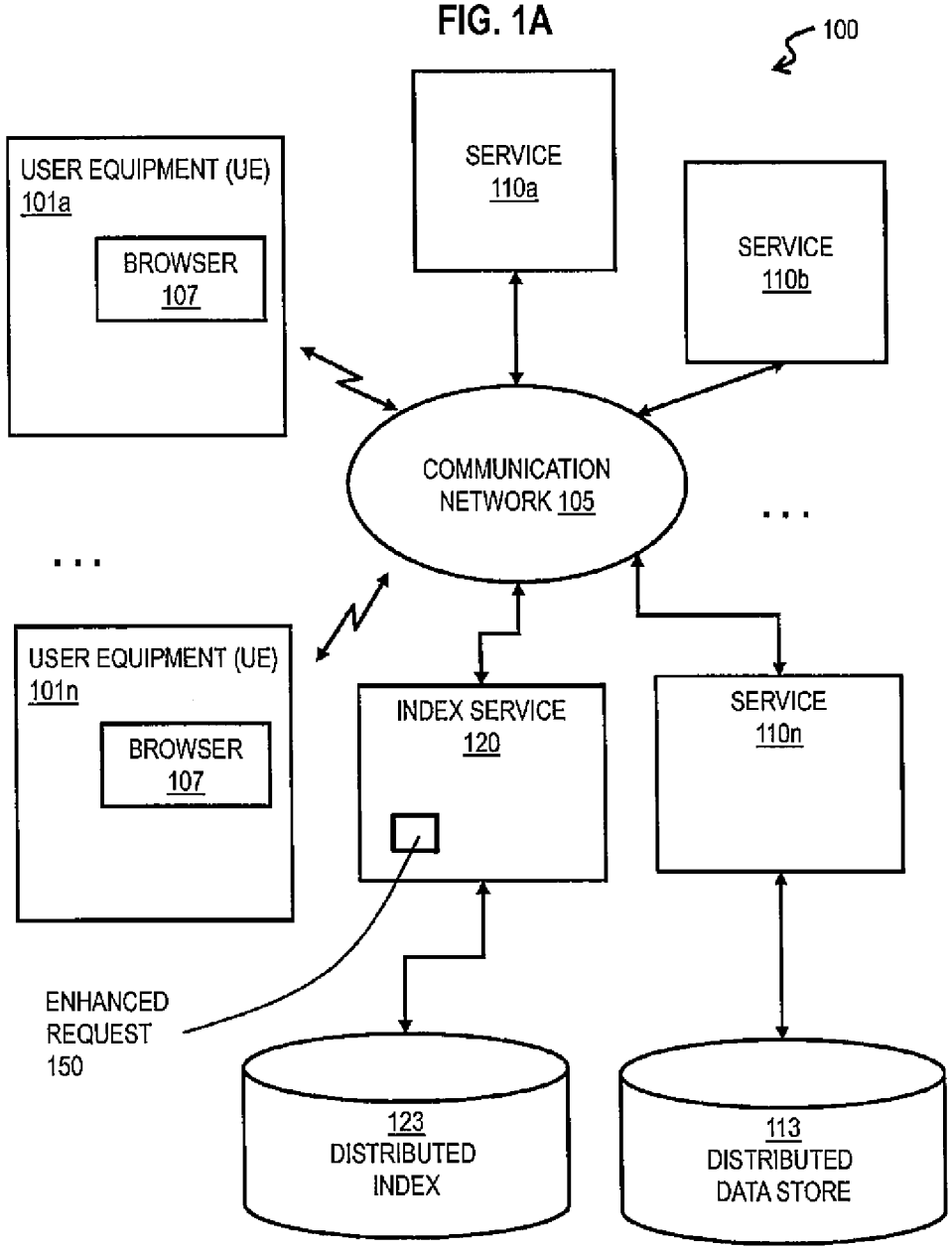

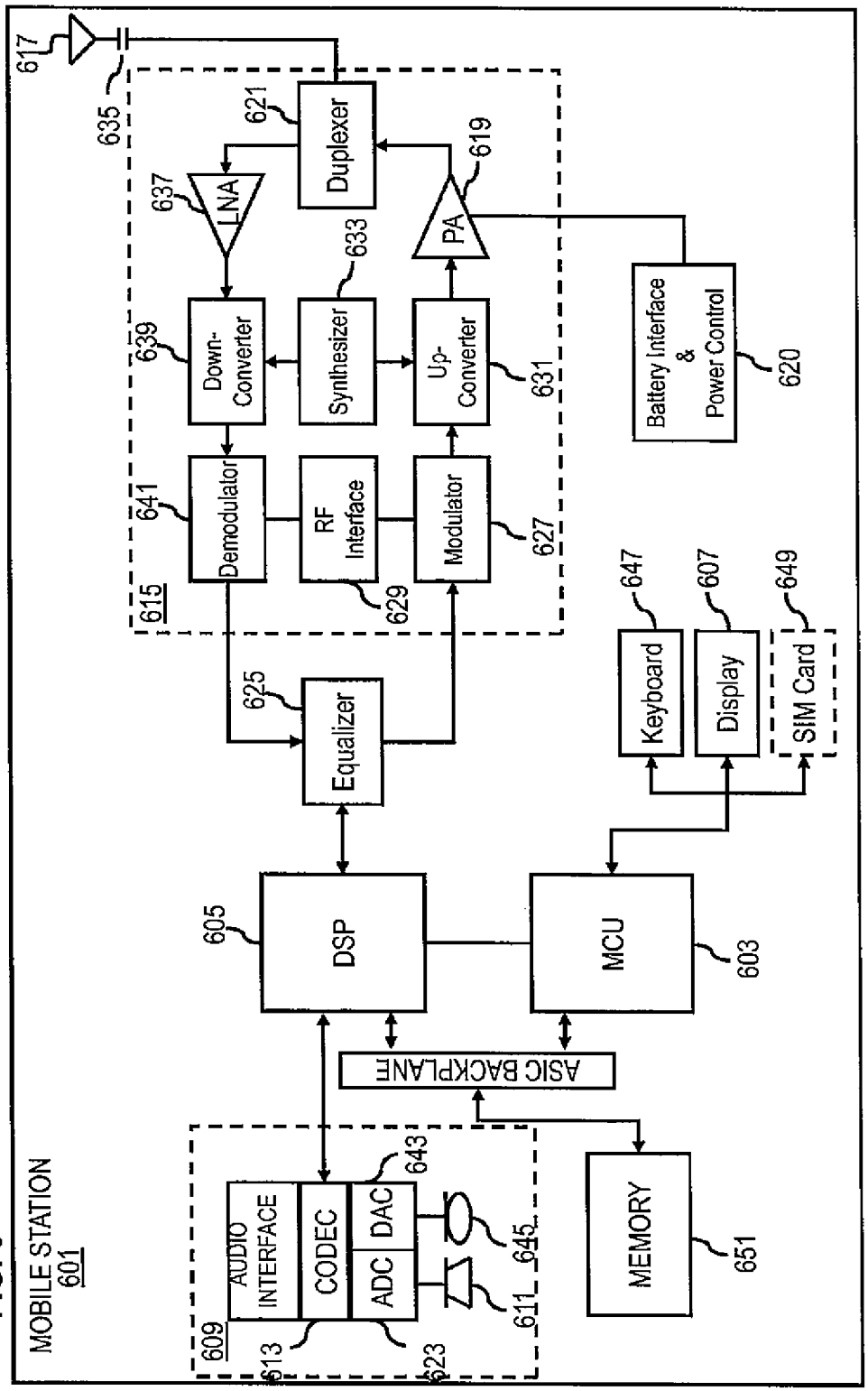

METHODS, APPARATUSES AND COMPUTER PROGRAM PRODUCTS FOR PERFORMING INDEX SEARCH OPTIMIZATION

TECHNICAL FIELD

Various implementations relate generally to methods, apparatuses, and computer program products for performing index search optimization.

BACKGROUND

Service providers and device manufacturers are continually challenged to deliver value and convenience to consumers by providing compelling network services. Important differentiators in the industry are application and network services, as well as capabilities to support and scale these services. In particular, these applications and services may include accessing and managing data utilized by network services. These services entail managing a tremendous amount of user data, such as terabytes of data available through online stores for books, audio and video or online storage of personal emails, pictures, audio and video for a large number of subscribers. To search these large data holdings, indices are generated that associate data objects such as books, images, and files with searchable fields, such as dates and subject matter. The indices themselves may become quite large. Some services store such indices distributed among many network nodes so that each node maintains an index of a size that can be searched in a reasonably short period of time. However the indices are partitioned, some searches may involve most or all partitions of the index, and thus may consume large amounts of computational power and network bandwidth, with inherent delays in responding to individual search requests.

When executing a search request, strict performance requirements are involved. The query response time may be crucial for the users. When dealing with large amounts of data, a rapid response becomes even more difficult, as the search response time can be dramatically impacted by the volume of data that must be searched. Even in situations where large amounts of data are split and distributed across multiple servers, when a query is executed, the query may need to be run on all servers, and then the result from each of these queries needs to be merged together. Some types of queries may take much longer to execute than others.

SUMMARY OF SOME EMBODIMENTS

Therefore, there is a need for developing improved approaches for performing index search optimization which do not suffer all of the disadvantages of prior art approaches.

According to one embodiment, a method comprises receiving a search query for a search of an index. The index has been partitioned across a plurality of nodes. In response to determining that the search query is not deterministic, the search is performed within a local partition to identify a first quantity of matches for the search. In response to determining that the first quantity is equal to or greater than a predetermined threshold, a second quantity of matches is estimated for one or more partitions other than the local partition, and an execution path for optimization is selected. In some embodiments, the request is deterministic if no more than a predetermined number of sets of index entries at least substantively satisfies the request, for example if only one set of index entries substantively satisfies the request.

According to another embodiment, a method comprises receiving a search query for a search of an index. The index has been partitioned across a plurality of nodes. In response to analyzing the query and determining that it is possible to identify a partition or a set of partitions that contains one or more matching rows, a determination is performed to identify the partition or the set of partitions that contains the one or more matching rows. The query is then routed to the identified partition or to the identified set of partitions.

According to a still further embodiment, a method comprises searching and analyzing a local partition in response to receiving a deterministic query. A secondary query is formulated to run against a full set of partitions or a subset of one or more remaining partitions based on the analysis.

According to a still further embodiment, a method comprises searching and analyzing a local partition in response to receiving a deterministic query. The analyzing is performed to determine a best execution path for satisfying the query.

According to another embodiment, an apparatus comprises at least one processor, and at least one memory including computer program code, the at least one memory and the computer program code configured, with the at least one processor, to cause the apparatus to receive a search query for a search of an index. The index has been partitioned across a plurality of nodes. In response to determining that the search query is not deterministic, the search is performed within a local partition to identify a first quantity of matches for the search. In response to determining that the first quantity is equal to or greater than a predetermined threshold, a second quantity of matches is estimated for one or more partitions other than the local partition, and an execution path for optimization is selected. In some embodiments, the request is deterministic if no more than a predetermined number of sets of index entries at least substantively satisfies the request, for example if only one set of index entries substantively satisfies the request.

According to another embodiment, an apparatus comprises at least one processor, and at least one memory including computer program code, the at least one memory and the computer program code configured, with the at least one processor, to cause the apparatus to receive a search query for a search of an index. The index has been partitioned across a plurality of nodes. In response to analyzing the query and determining that it is possible to identify a partition or a set of partitions that contains one or more matching rows, a determination is performed to identify the partition or the set of partitions that contains the one or more matching rows. The query is then routed to the identified partition or to the identified set of partitions.

According to a still further embodiment, an apparatus comprises at least one processor, and at least one memory including computer program code, the at least one memory and the computer program code configured, with the at least one processor, to cause the apparatus to search and analyze a local partition in response to receiving a deterministic query. A secondary query is formulated to run against a full set of partitions or a subset of one or more remaining partitions based on the analysis.

According to a still further embodiment, an apparatus comprises at least one processor, and at least one memory including computer program code, the at least one memory and the computer program code configured, with the at least one processor, to cause the apparatus to search and analyze a local partition in response to receiving a deterministic query. The analyzing is performed to determine a best execution path for satisfying the query.

According to another embodiment, a computer-readable storage medium carries one or more sequences of one or more instructions which, when executed by one or more processors, cause, at least in part, an apparatus to receive a search query for a search of an index. The index has been partitioned across a plurality of nodes. In response to determining that the search query is not deterministic, the search is performed within a local partition to identify a first quantity of matches for the search. In response to determining that the first quantity is equal to or greater than a predetermined threshold, a second quantity of matches is estimated for one or more partitions other than the local partition, and an execution path for optimization is selected. In some embodiments, the request is deterministic if no more than a predetermined number of sets of index entries at least substantively satisfies the request, for example if only one set of index entries substantively satisfies the request.

According to another embodiment, a computer-readable storage medium carries one or more sequences of one or more instructions which, when executed by one or more processors, cause, at least in part, an apparatus to receive a search query for a search of an index. The index has been partitioned across a plurality of nodes. In response to analyzing the query and determining that it is possible to identify a partition or a set of partitions that contains one or more matching rows, a determination is performed to identify the partition or the set of partitions that contains the one or more matching rows. The query is then routed to the identified partition or to the identified set of partitions.

According to a still further embodiment, a computer-readable storage medium carries one or more sequences of one or more instructions which, when executed by one or more processors, cause, at least in part, an apparatus to search and analyze a local partition in response to receiving a deterministic query. A secondary query is formulated to run against a full set of partitions or a subset of one or more remaining partitions based on the analysis.

According to a still further embodiment, a computer-readable storage medium carries one or more sequences of one or more instructions which, when executed by one or more processors, cause, at least in part, an apparatus to search and analyze a local partition in response to receiving a deterministic query. The analyzing is performed to determine a best execution path for satisfying the query.

According to another embodiment, an apparatus comprises means for performing the steps of one of the above methods.

According to another embodiment, a computer program product includes one or more sequences of one or more instructions which, when executed by one or more processors, cause an apparatus to at least perform the steps of one of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE FIGURES

Various embodiments are illustrated by way of example, and not by way of limitation, in the figures of the accompanying drawings in which:

FIG. 1A is a diagram of a system capable of performing index search optimization for search requests that are directed to a partitioned index, according to one embodiment;

FIG. 6 is a diagram of a mobile terminal (e.g., handset) that can be used to implement an embodiment of the invention.

DESCRIPTION OF SOME EMBODIMENTS

Figure 1B:
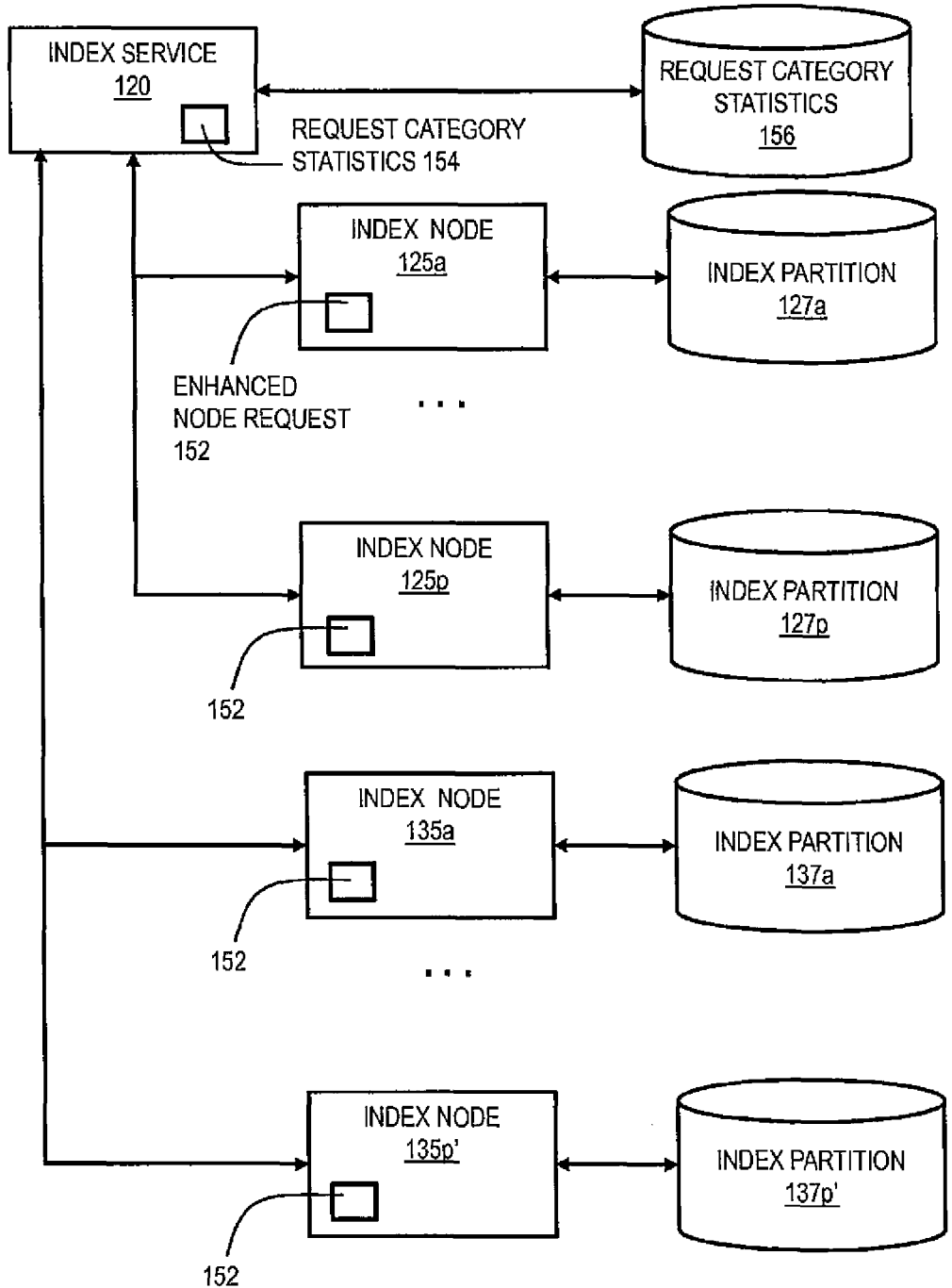
FIG. 1B is a diagram of the components of index service distributed indices, according to one embodiment.

In many cases, searching throughout an entire volume of data is not necessary. Searching only a portion of the data might be sufficient for satisfying a given query or request. Sometimes users are not interested in an exact result, and a partial or an estimated value might be good enough. In addition to that, using different execution strategies may also bring about a significant improvement. Illustrative goals for optimization are to minimize query execution time and to minimize the total cost of executing the query.

According to various exemplary embodiments described herein, the optimization techniques include any of: (a) minimizing a number of partitions to run the search against; (b) minimizing a number of rows to return from each partition for aggregation; (c) minimizing the number of rows to fetch; or (d) minimizing the number of rows to collect on each partition. In general, search optimization involves minimizing the overall search execution time as well as the total cost incurred to execute a query. Illustratively, the optimization may involve setting one or more parameters on the server side including any of: (a) a level of confidence to be used for sampling; (b) a margin of error to be allowed or accepted; (c) setting a facet count to an estimated count or to an exact count; or (d) setting a total count to an estimated count, an exact count, or no total count.

Examples of methods, apparatuses, and computer program products are disclosed for performing index search optimization for search requests directed to a partitioned index. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term partition refers to a data structure holding a portion of a larger data set. The data set may hold any kind of data, from subscriber data to contents of a music store, book store, video store, art store, game store or any other source of digital content on a communications network. The term index refers to a data structure with at least one field that can be searched. In some embodiments, the entire contents of a store are not arranged in an index, but a subset of the information is placed into a much smaller index that is more efficient to search. For example a bookstore could make every page of every book searchable and therefore an index as defined herein. However, it is often more efficient to pull just some fields that are searchable into an index. For example, a few fields that indicate the title, author, publication date, copyright date, ISBN number, a review and a rating are sufficient for a searcher to determine whether a book should be ordered, and every page of the book need not be included as a field of the index. Although various embodiments are described with respect to a partitioned index that points to physical or digital books that can be ordered from a bookstore, it is contemplated that the approach described herein may be used with other indices for other digital content or physical objects.

FIG. 1A is a diagram of a system capable of performing index search optimization for processing of search requests directed to a partitioned index, according to one embodiment. Users of user equipment (UE) 101*a* through UE 101*n* (collectively referenced hereinafter as UE 101) access any of network services 110*a*, 110*b* through 110*n* (collectively referenced hereinafter as network services 110).

The network services 110 acquire and store large amounts of information in one or more data storage media called data stores hereinafter. For example, service 110*n* maintains distributed data store 113. Because such data stores can become very large, with terabytes of data (1 terabyte, TB, $10^{12}$ bytes, where one byte=8 binary digits called bits), it becomes inefficient to search through all this data to find a particular entry. As a consequence, a considerably smaller index of important fields for searching is formed and managed by an index service 120. However, even the index of a few important fields per entry can include billions of entries. To distribute the computational load of maintaining and searching the index, the index is partitioned; and each partition is placed on a different node of a distributed index 123 that includes multiple nodes. For example, for an index holding two billion ($2\times10^9$) entries, each of 200 nodes handles a partition of 10 million index entries. When a request to search the index is received, each node of the distributed index searches its own partition for index entries that satisfy the search criteria; and the results are aggregated by the index service 120.

It is not required that the partitions be distributed uniformly among nodes. For instance, two partitions may be placed on a first node and zero partitions may be placed on a second node. However, in many cases, it is better to provide a uniform distribution of partitions among the nodes. An additional consideration is that there may be fewer nodes than partitions, so some or all of these nodes may get more than one partition.

Searching the partitions at every node can be wasteful, because many requests can be satisfied by the index entries on only a few of the nodes. Not only does it involve nodes in doing searches that are not needed to substantively satisfy the request, but the aggregator is forced to handle and sort through all the responses (e.g., the matches) to form the response request. For example, if a request is received for 100 titles including the phrase "Civil War" sorted by date, and if each node averages about 50 such titles, the request could be satisfied by two average nodes. Yet 200 nodes will respond to the request, yielding 10,000 titles. The computational load and bandwidth consumed by 198 nodes going through up to ten million entries are wasted. At the same time, the aggregator must pick through or sort by date 10,000 titles to pick 100 to substantively satisfy the request, wasting computational resources on the aggregator, e.g., index service 120.

To address this problem, a system 100 of FIG. 1A introduces the capability to enhance processing of search requests directed to one or more partitioned indices. According to various embodiments, the index service 120 includes an enhanced request module 150. The enhanced request module 150 determines when a request is deterministic and should be processed by all nodes, and when a request is not deterministic and should be processed first by a few nodes that are likely to substantively satisfy the request. In some embodiments, the enhanced request module 150 also offers the capability to substantively satisfy the deterministic request with high confidence but with many fewer operations than brute force approaches.

As shown in FIG. 1A, the system 100 comprises user equipment (UE) 101 having connectivity to network services 110 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

At least one network service 110 has access to an index service 120 to build and maintain a partitioned index for that service. In some embodiments, each network service 110 has its own index service. In some embodiments, a standalone index service 120 offers indexing services for multiple other network service 110. The index service 120 receives each index entry from a network service 110 and sends it to one partition of the distributed index 123 for storage. The index service 120 also receives each search request from a network service 110 and selects at least one node of the distributed index 123 to process the search request. The node selected is varied for different requests to distribute the load of processing requests.

By way of example, the UE 101 and network services 110 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OR Reference Model.

Processes executing on various devices, often communicate using the client-server model of network communications, widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most devices (called nodes) connected to a communications network is a World Wide Web client (called a "web browser," or simply "browser") that interacts through messages formatted according to the hypertext transfer protocol (HTTP) with any of a large number of servers called World Wide Web (WWW) servers that provide web pages.

In the illustrated embodiment, each UE 101 includes a browser 107 to communicate with a WWW server included within each network service 110. In some embodiments, a separate service client (not shown) for one or more of the network services 110 is included on one or more UE 101.

FIG. 1B is a diagram of the components of index service distributed indices, according to one embodiment. By way of example, the distributed index 123 includes two or more nodes, each with one or more components comprising an enhanced node request module 152. In some embodiments, the index service 120 includes a request category statistics module 154 that maintains a request category statistics data structure 156. One or more of these components provide enhanced processing of search requests directed to a partitioned index. It is contemplated that the functions of these components may be combined in one or more components or performed by other components of equivalent functionality on the nodes depicted or different nodes. For example, in some embodiments, some or all the functions of the request category statistics module 154 are performed by the enhanced node request modules 152 together, the enhanced node request modules 152, request category statistics module 154 and data structure 156 constitute the enhanced request module 150 depicted in FIG. 1A.

In the illustrated embodiment, the distributed index 123 includes index node 125*a* through index node 125*p* (collectively referenced hereinafter as index nodes 125) for a first index, and includes index node 135*a* through index node 135*p'* (collectively referenced hereinafter as index nodes 135) for a second index, where p indicates the number of partitions in the first index and p' indicates the number of partitions in the second index. In other embodiments distributed index 123 includes index nodes for more or fewer indices. Each index node 125, 135 maintains and searches the index entries in at least one index partition for at least one index. In the illustrated embodiment, index nodes 125*a* through index node 125*p* operate on the index entries in index partition 127*a* through 127*p*, respectively (collectively called index partitions 127 hereinafter). Similarly, index nodes 135*a* through index node 135*p'* operate on the index entries in index partition 137*a* through 137*p'*, respectively (collectively called index partitions 137 hereinafter).

When a search request is received at the index service for searching one of the indices, the request is directed to one of the index nodes for the requested index. The index node that receives the request is called an aggregator node and is responsible for substantively satisfying the request with index entries from any of the partitions. The index service 120 distributes multiple requests across the different index nodes so that each serves as the aggregator node for at least some requests. This serves to distribute the load of responding to search requests. The aggregator node determines what index entries to request from the other index nodes for the index, if any. The aggregator receives the matching index entries (called matches herein) from the other index nodes, if any, and combines the matches into one response that is sent to the requesting network service 110 via the index service process 120.

According to various embodiments, each index node 125, 135 includes an enhanced node request module 152 for processing such search requests. The decision of how many entries to request from each of which index nodes is based on whether the request is deterministic or not. A search request is deterministic if the final result set for the request cannot be chosen at random. This concept may also be referred to herein as only one set of index entries satisfying a search request. For example, if the request is asking for five most recently published books containing "Civil War" in their title and the index contains one hundred books that match the search criteria, all one hundred matches are sorted based on their publication dates and the top five sorted matches are returned as the result. In many cases, the top five entries are always the same, but in some cases, they may not be. If two or more books have the same publication date, there may be more than a single set of index entries (i.e., final result sets) that substantively satisfy ALL of the user's criteria. In rare cases, any selection of five entries from the one hundred matching entries may satisfy all of the user's criteria. This could happen, for example, when all one hundred matching entries have the same publication date. Even under such circumstances, the request is still considered deterministic because the system could not have picked five random entries from the one hundred matches before processing all of them.

Pursuant to another example, in an index of books available for sale, a request may be for the 50 most recently published books with "Civil War" in the title. This request is a deterministic request, even if the predetermined number of sets that render a request deterministic is one. Only the one set with the 50 titles most recently published satisfy this request. Similarly, a request may be for 8 of the 10 most recently published books with "Civil War" in the title. Such a request is substantively satisfied by a number of sets (10 items selected 8 at a time, about equal to 10 factorial divided by 8 factorial, 10!/8!=10*9=90 sets). If the predetermined number of sets that makes a request deterministic is 100, then this request is deterministic.

In contrast, a request for 50 books with "Civil War" in the title arranged in publication order is not deterministic; any 50 books of the hundreds of books in the index with "Civil War" in the title can be arranged in publication date order and satisfy this request. Many thousands of combinations would satisfy such a request; and, even with a predetermined number of sets of 100, this request would not be deterministic. For purposes of illustration, it is assumed in the following that the predetermined number of sets of index entries is one for a request to be considered deterministic. An index entry that satisfies all search criteria is said to be a match of the search. A response to a search request may include a match or an entry that is an approximate match (satisfies almost all search criteria).

Thus, the system 100 includes receiving a current request for a search of an index, wherein the index is partitioned across a plurality of a number P of nodes in communication over a network. The system 100 further includes determining whether the current request is deterministic, wherein a search request is deterministic if only one set of index entries completely satisfies the search request. And, the system 100 includes determining a number K of matches to request from each of a number N of nodes of the plurality of nodes based on whether the current request is deterministic.

Although processes and data structures are shown in FIG. 1A and FIG. 1B as integral blocks in a particular order on particular nodes of the communication network for purposes of illustration, in other embodiments, one or more processes or data structure or portions thereof are arranged in a different order on the same, more or fewer nodes of the network or in one or more databases or are omitted or one or more additional processes or data structures are included.

Figure 2A:
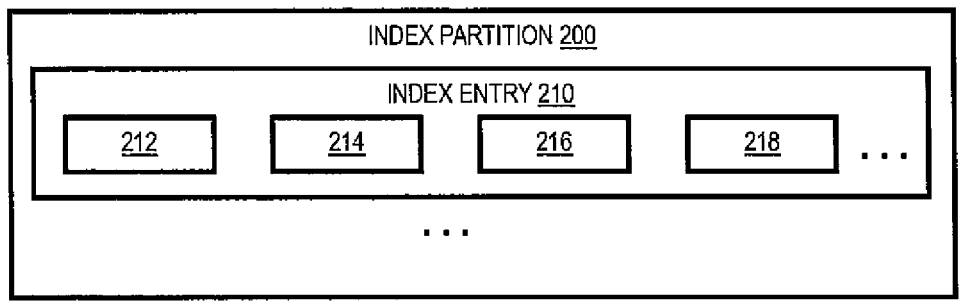
FIG. 2A is a diagram of an index partition data structure, according to an embodiment.

FIG. 2A is a diagram of an index partition data structure 200, according to an embodiment. The index partition data structure 200 is a particular embodiment of one the index partitions 127 or 137 of one index. The index partition data structure 200 includes multiple index entries as indicated by index entry 210 and ellipsis. Each index entry 210 includes two or more fields, such as fields 212, 214, 216, 218 and others indicated by ellipsis, collectively referenced as index fields 212. Each field holds data that indicates a value for a corresponding parameter. One or more of the fields 212 are searchable by the network service 110 for which the index is maintained.

For example, in a book index several fields hold text or numbers that represent values for corresponding parameters that include title, author, International Standard Book Number (ISBN), publication date, copyright date, review and rating, among others, in any combination of one or more parameters. Similarly, in a game index, several fields hold text or numbers that represents values for the parameters that include name, game type, vendor, platform on which the game operates and rating, among others, in any combination of one or more.

Figure 2B:
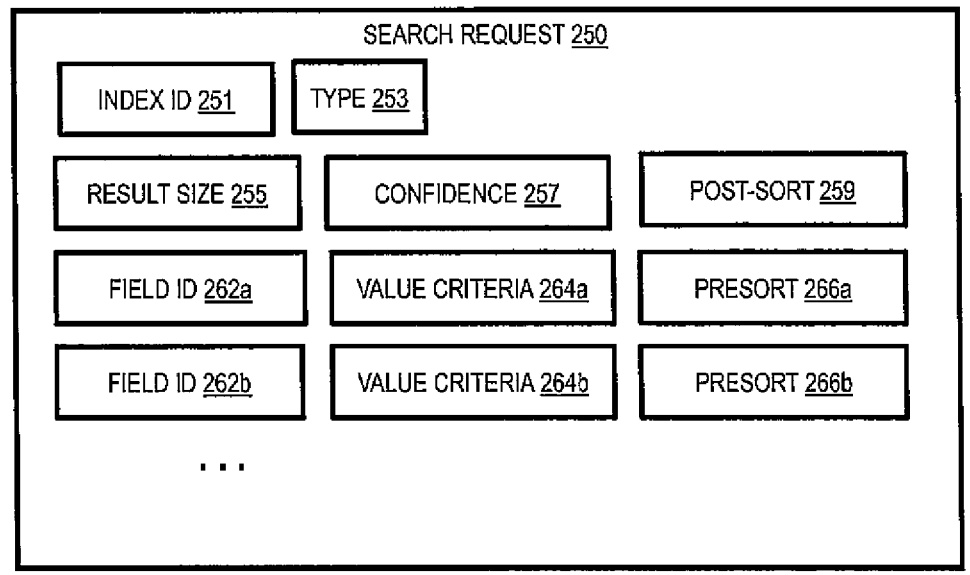
FIG. 2B is a diagram of a search request message, according to an embodiment.
Figure 2C:
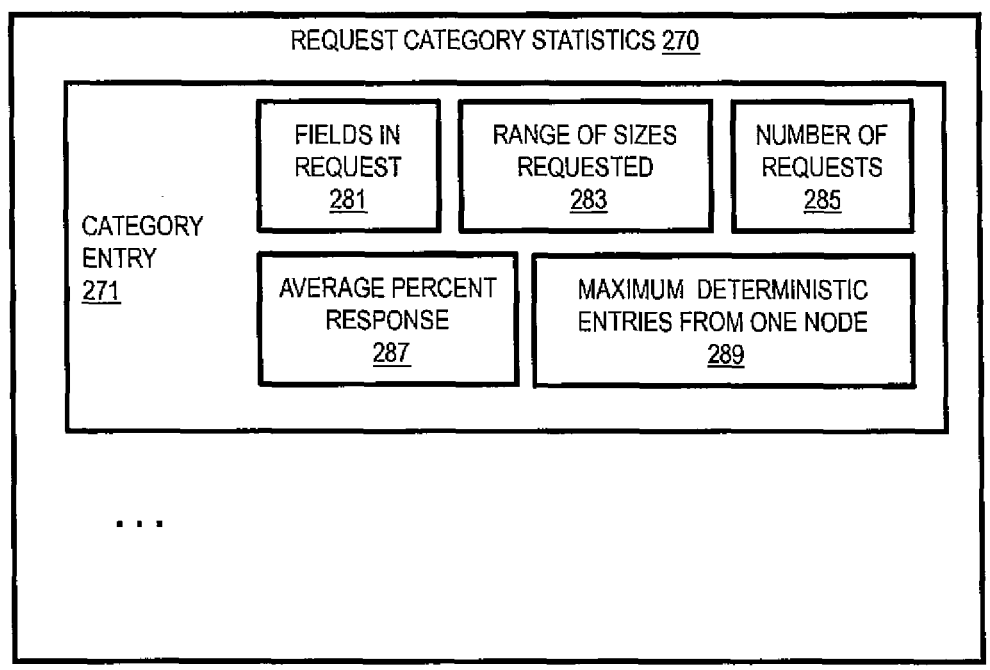
FIG. 2C is a diagram of a request category statistics data structure, according to an embodiment.

Although fields, entries, messages and data structures are depicted in FIG. 2A through FIG. 2C as integral blocks in a particular arrangement for purposes of illustration, in other embodiments, one or more fields, entries, messages, data structures, or portions thereof, are arranged in a different order or in one or more messages or one or more databases on one or more nodes of the communications network, or are omitted, or one or more additional fields, entries or data structures are included.

FIG. 2B is a diagram of a search request message 250, according to an embodiment. A search request message 250 is sent from a network service 110 to the index service 120 to search a particular one of the indices based on some interaction with a UE 101 of a particular user. The index service 120 forwards the request to one of the index nodes of the particular index. That index nodes serves as the aggregator node. If the aggregator node determines that another index node of the same particular index is also to be involved, then a search request 250 is sent from the aggregator index node to one or more other index nodes for the particular index.

In the illustrated embodiment, the search request message 250 includes two or more of an index ID field 251, a type field 253, a result size field 255, a confidence level field 257 and a post-sort field 259 and one or more search criteria. Each search criterion is indicated by a set of fields, such as an index field identifier (ID) field 262a, a value criteria field 264a and a presort condition field 266a. A second criterion is indicated by fields 262b, 264b and 266b. Subsequent criteria, if any, are represented by ellipsis.

The index ID field 251 holds data that indicates which of two or more indices managed by the index service 120 is to be searched. In some embodiments in which the index service 120 maintains only one index, field 251 may be omitted. An advantage of specifying the index ID is that one index service 120 can manage multiple indices. The index ID field 251 is an example means to achieve this advantage.

The type field 253 holds data that indicates whether the request message 250 is from a network service 110, or from the index service 120 to the aggregator node, or from the aggregator node to another index node of the same index. An advantage of specifying the type is that an index node that is responding to a request from an aggregator index simply examines its own index partition and does not need to consume computational resources to determine and request contributions from other index nodes. The type field 253 is an example means to achieve this advantage. In some embodiments, there are two distinct interfaces (such as APIs) to each index node 125. One interface is invoked by the client on the aggregator node and the other interface is invoked by the aggregator node on another index node. In such embodiments, neither the aggregator nor the other index node needs to use any IDs to know where the call is coming from and what the response to the call is. In such embodiments, the type field 253 is omitted.

The result size field 255 holds data that indicates a target number T of index entries to return, which all match all the search criteria, i.e., a target number T of matches to return. In some embodiments, the target number of matches is determined independently of the request message, e.g., as a default quantity or by a calculation of the amount of computational power to be consumed in matching the criteria, and field 255 is omitted. An advantage of specifying the target number T is that computational and bandwidth resources are not wasted aggregating and returning an excessive number of matches that neither the network service 110 nor the user of UE 101 desires to parse. The result size field 255 is an example means to achieve this advantage.

The confidence level field 257 holds data that indicates a confidence level for obtaining the single set of matches for a deterministic request. In some embodiments, the confidence level is determined independently of the request message, e.g., as a default quantity or by a calculation of the cost benefit of deviating from 100% confidence, and field 255 is omitted. An advantage of specifying the confidence level is that computational and bandwidth resources are not consumed aggregating and returning matches that are unlikely to contribute to the single set of matches. The confidence level field 257 is an example means to achieve this advantage.

The post sort field 259 holds data that indicates how to sort the index entry matches in a response that includes multiple such matches. For example, the post-sort field 259 holds data that indicates the index fields and ascending or descending orders for sorting the matches.

The index field ID fields 262a, 262b, among others indicated by ellipsis (collectively referenced as index field ID field 262) hold data that indicates one of the fields 212 in an index entry 210. Any method may be used to indicate the index field, e.g., by its ordinal number in the index entry or by its parameter name. For example, the title field in a book index is indicated by the text "Title" or the ordinal number "1."

The value criteria fields 264a, 264b, among others indicated by ellipsis (collectively referenced as value criteria field 264) hold data that indicates one or more values or value ranges to be satisfied by matching index entries. For example, the value criteria field holds data that indicates "includes 'Civil War'" or "excludes 'computer'" or "starts with letters 'Ca' through 'Ebo'." if all values are acceptable, e.g., the field is used only for sorting, then the value criteria includes data that indicates "null" or equivalent or the field is omitted.

The presort fields 266a, 266b among others indicated by ellipsis (collectively referenced as value criteria field 266) hold data that indicates one or more sort criteria for a sort to be performed before a final match set is determined. If there is not a presort criteria, e.g., the index field indicated in field 262 is used only for selection, then the presort field includes data that indicates "None" or equivalent, or the field is omitted. For example, to include the oldest publication dates, the presort field 266 for the publication date field holds data that indicates "oldest" or equivalent. For example, to include the highest rated books, the presort field 266 for the rating field holds data that indicates "highest" or equivalent. Typically, an entry other than "none" or equivalent in any presort field 266 renders the search request of the message 250 deterministic.

FIG. 2C is a diagram of a request category statistics data structure 270, according to an embodiment. The request category statistics data structure 270 is a particular embodiment of request category statistics data structure 156. The request category statistics stored in data structure 270 are used in some embodiments to estimate the number of matches expected from the average node based on the category of the request and past experience. Any method may be used to determine the category. For example, in some embodiments, the network service 110 that forms the request is programmed to only submit a limited range of request types (e.g., by author, or by title and publication date) and each type is assigned a category. In the illustrated embodiment, a request is categorized by the collection of index fields listed in the request message fields 262 of the corresponding request message 250 and the result size, if any, indicated in field 255 of the request message 250. Because a wide range of result sizes can be requested, in the illustrated embodiment, each category includes a range of result sizes, e.g., 1-10, 11-50, 51-100, 101-500, 501-1000, 1001-5000, 5001-10000, or greater than 10000. In some embodiments, estimates are not based on category statistics; and data structure 159 (including embodiment 270) is omitted.

For each different category of request received by the index service, a category entry field 271 is added to request category statistics data structure 270. Other category entry fields are indicated by ellipsis. Each category entry field 271 includes a list of fields in request field 281, a range of sizes requested field 283, a number of requests field, an average percent response field 287, and a maximum deterministic entries from one node field 289.

The list of fields in request field 281 holds data that indicates a set of all index fields recited in the index field ID fields 262 of any single request message. For example, some request messages include only one index field (e.g., author) and other request messages include more index fields (e.g., title and publication date, or author and rating).

The range of sizes requested field 283 holds data that indicates one of the ranges used to define a category, as described above. For example, the field 283 holds data that indicates the range 501-1000; and requests that indicate in result size field 255 a target size in this range are included in the category.

The number of requests field 285 holds data that indicates the number of requests processed by the index service that fall within the category defined by fields 281 and 283. The more requests serviced for each category, the better the statistics represent the category. In some embodiments, a time of the previously processed requests is also recorded; and the responses to the more recent requests are given more weight.

The average percent response field 287 holds data that indicates the average percent response from one node, i.e., 100% times the number of matches returned from a node divided by the number requested of the node. For example, if one request message indicates a target size T of 500 matches in field 255, but the index node that receives the request only finds 350 matches on its local partition, then the percent response to such a request is 70. This information is passed to the request category statistics module 154 which increments the field 285 and computes a new average percent response for the category. The new average percent response is stored in field 287. In some embodiments, the value in the field 287 is weighted by the number of requests that it represents. For example, if there have been 9 previous requests in the category (as indicted in field 285) that produced an average of 50% response, then adding the 70% response for the most recent request produces a new average of (9*50%+70%)/10=52%. This is just an extreme simplification of the calculation for the purpose of demonstration only. In reality, the calculation may be more complicated than this. For instance, the recency of the request (how recent the request is) as mentioned previously will influence the results. The update to the statistics may be performed periodically, or on every request, or in any other way.

In some embodiments, as the index grows, the fields 285 and 287 are reset to zero periodically, e.g., every three months, so that the statistics represent the latest state of the index. In some embodiments that include time of request, the fields are not reset, but more recent responses are given more weight.

The maximum deterministic entries from one node field 289 holds data that indicates the most matches that any one partition contributed to a deterministic result for a request in the category. Non-deterministic requests are not included in this statistic. For example, if index entries are distributed randomly across 200 partitions and a deterministic request is received for 600 matches, e.g., for the 600 highest rated books that include Civil War in the title published since 1960, then it is unlikely that all 600 highest rated books are found in one partition. It is more likely that there are on the order of 600/200=3 of the highest rated books in each partition. However, to be 100% confident that the 600 highest rated books are returned in response to the request, in some embodiments, the aggregator node requests the 600 highest rated books from each of the 200 nodes.

Assuming that each node has at least 600 such books, as many as 120000 entries are returned to the aggregator, which then sorts them to find the highest rated 600 to return as matches in the response. The aggregator node is in a position to see how many of the 600 matches came from each node. For purposes of illustration, it is assumed that one node contributed 11 of the matches and all other nodes contributed fewer, some even contributing none of the matches. In this example, the most that any one partition contributed to a deterministic result is 11. Continuing with this example, if 11 is greater than the value already stored in field 289, then the value 11 is stored in the field 289. This informs the system 100 that if a deterministic request is received in this category, then it is likely to be sufficient to ask for 11 matches from each node, rather than 600. The obvious advantage is a great reduction in the bandwidth and computation resources consumed on each node. Field 289 is an example means to achieve this advantage. In other embodiments, more or fewer or different statistics are included in each category entry field 271.

According to one set of illustrative embodiments, a method comprises receiving a search query for a search of an index. The index has been partitioned across a plurality of nodes. In response to analyzing the query and determining that it is possible to identify a partition or a set of partitions that contains one or more matching rows, a determination is performed to identify the partition or the set of partitions that contains the one or more matching rows. The query is then routed to the identified partition or to the identified set of partitions.

According to another set of illustrative embodiments, a method comprises searching and analyzing a local partition in response to receiving a deterministic query. A secondary query is formulated to run against a full set of partitions or a subset of one or more remaining partitions based on the analysis.

According to another set of illustrative embodiments, a method comprises searching and analyzing a local partition in response to receiving a deterministic query. The analyzing is performed to determine a best execution path for satisfying the query.

According to another set of illustrative embodiments, a computer-readable storage medium carries one or more sequences of one or more instructions which, when executed by one or more processors, cause, at least in part, an apparatus to receive a search query for a search of an index. The index has been partitioned across a plurality of nodes. In response to determining that the search query is not deterministic, the search is performed within a local partition to identify a first quantity of matches for the search. In response to determining that the first quantity is equal to or greater than a predetermined threshold, a second quantity of matches is estimated for one or more partitions other than the local partition, and an execution path for optimization is selected. In some embodiments, the request is deterministic if no more than a predetermined number of sets of index entries at least substantively satisfies the request, for example if only one set of index entries substantively satisfies the request.

Figure 3A:
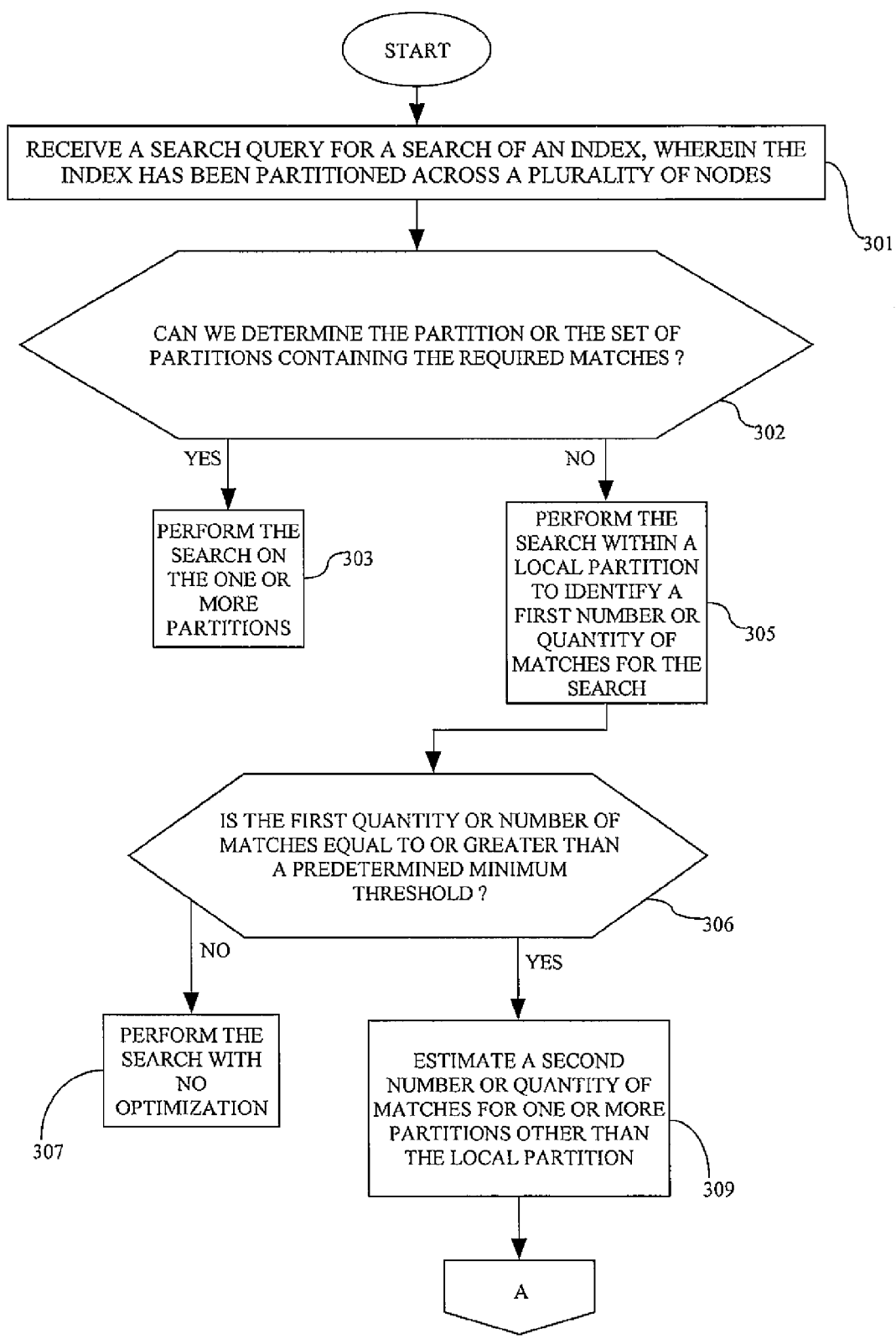
FIGS. 3A-3C together comprise a flowchart of one exemplary set of processes for performing index search optimization according to one set of embodiments.
Figure 3B:
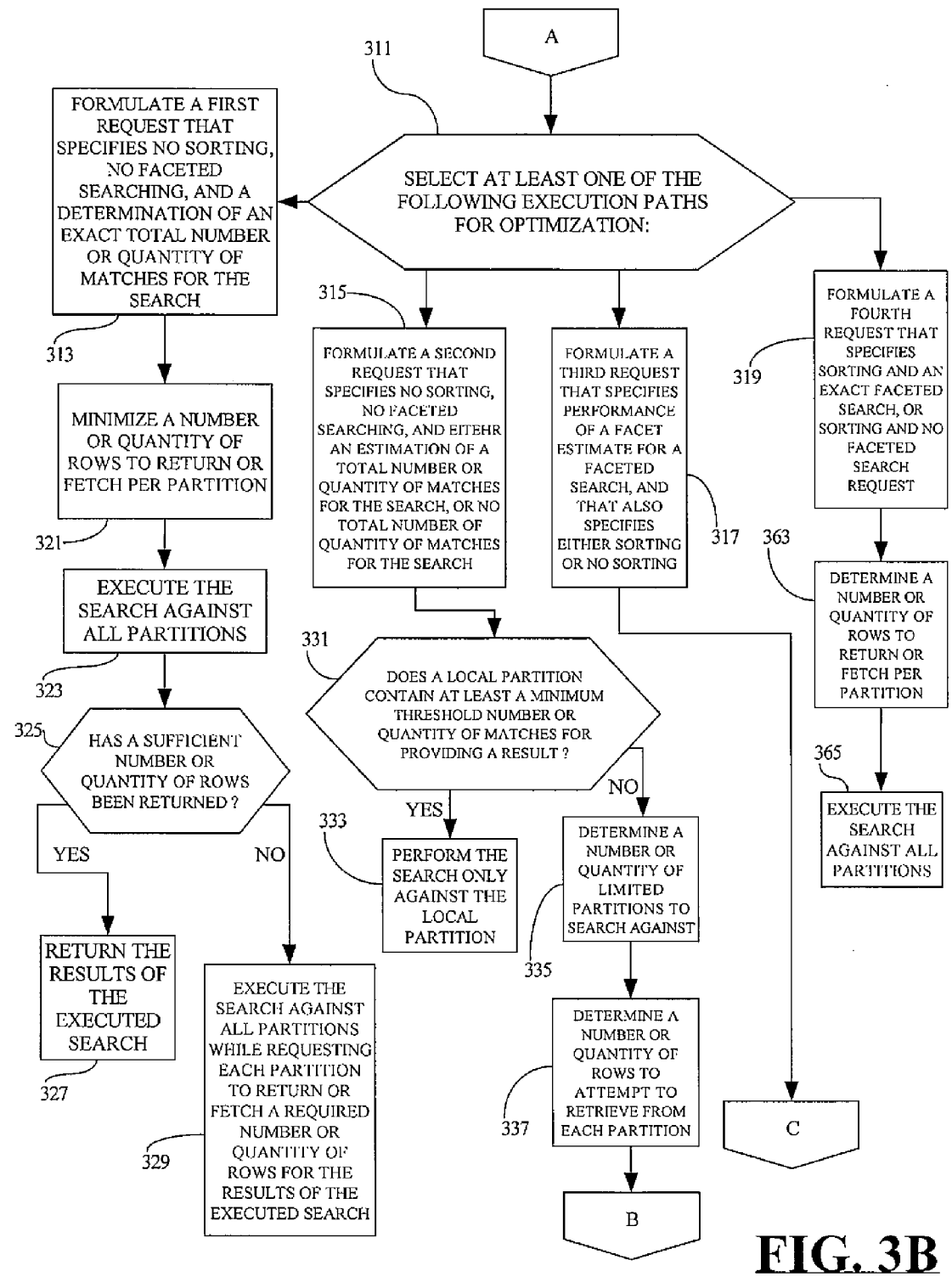
Figure 3C:
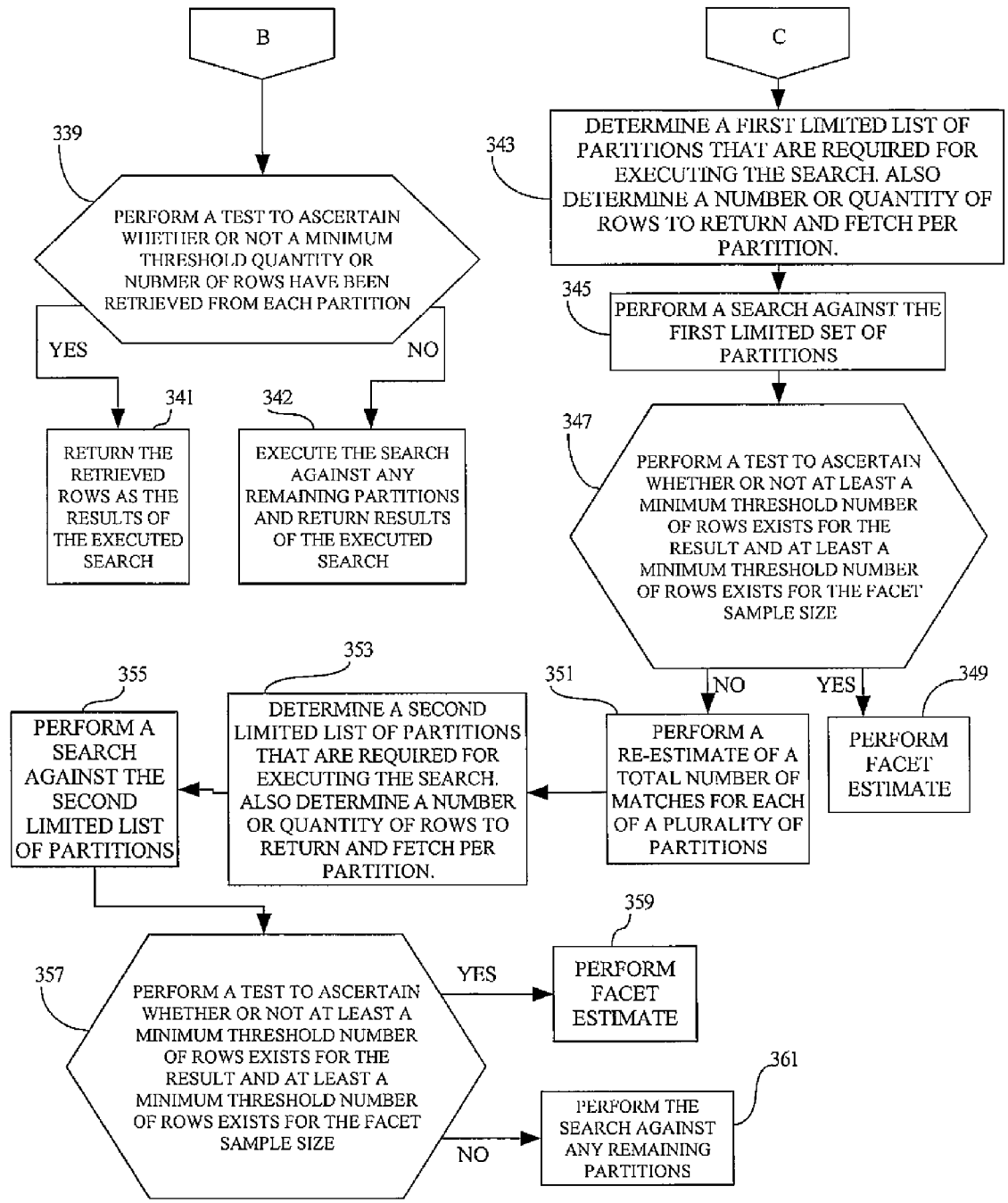

FIGS. 3A-3C together comprise a flowchart that includes an exemplary set of processes for selecting an execution path for performing index search optimization according to one set of embodiments. The operational sequence commences at block 301 where a search query is received for a search of an index, wherein the index has been partitioned across a plurality of nodes. At block 302, a test is performed to ascertain whether or not it is possible to positively determine a list of one or more partitions that contain the required matches.

In response to the test ascertaining that the list of one or more partitions can be positively determined, program control progresses to block 303 where the search is performed on the one or more partitions. The negative branch from block 302 leads to block 305 where the search is performed within a local partition to identify a first number or quantity of matches for the search. In response to the first number or quantity of matches being less than a predetermined minimum threshold (block 306), then the search is performed with no optimization at block 307. In response to the number or quantity of matches being equal to or greater than the predetermined minimum threshold (block 306), a second number or quantity of matches for one or more partitions other than the local partition are estimated at block 309. Alternatively or additionally, the second number or quantity of matches may be estimated at block 309 with respect to all partitions comprising an entire population of data.

Program control progresses from block 309 to block 311 where at least one of a plurality of execution paths for optimization is selected. A first execution path commences at block 313 where a first request is formulated that specifies no sorting, no faceted searching, and a determination of an exact total number or quantity of matches for the search. Faceted searching, sometimes referred to as faceted navigation or faceted browsing, is a technique for accessing information organized according to a faceted classification system, allowing users to explore a collection of information by applying multiple filters. A faceted classification system classifies each information element along multiple explicit dimensions, enabling the classifications to be accessed and ordered in multiple ways rather than in a single, predetermined taxonomic order. Facets correspond to properties of the information elements. They may, but need not, be derived by analysis of the text of an item using entity extraction techniques or from pre-existing fields in a database such as author, descriptor, language, and format. Thus, existing web-pages, product descriptions or online collections of articles may be augmented with navigational facets.

The first execution path progresses from block 313 to block 321 where a number or quantity of rows to return or fetch per partition is minimized. Next, at block 323, the search is executed against all partitions. A test is performed at block 325 to ascertain whether or not a sufficient number or quantity of rows has been returned. If so, then the results of the executed search are returned at block 327. The negative branch from block 325 leads to block 329 where the search is executed against all partitions while requesting each partition to return or fetch a required number or quantity of rows for the results of the executed search.

A second execution path commences at block 315 where a second request is formulated that specifies no sorting, no faceted searching, and either an estimation of a total number or quantity of matches for the search, or no total number or quantity of matches for the search. Next, at block 331, a test is performed to ascertain whether or not a local partition contains at least a minimum threshold number or quantity of matches for providing a result. If so, the program advances to block 333 where a search is executed only against the local partition. The negative branch from block 331 leads to block 335 where a number or quantity of limited partitions to search against is determined. At block 337, a number or quantity of rows to attempt to retrieve from each partition is determined. Next, at block 339, a test is performed to ascertain whether or not a minimum threshold number or quantity of rows have been retrieved from each partition. If so, the retrieved rows are returned as the results of the executed search (block 341). The negative branch from block 339 leads to block 342 where the search is executed against any remaining partitions, and then the result is returned.

The following consideration may apply not only to the second execution path, but to other optimization paths as well. When a certain set of partitions is chosen, and/or a certain number of rows is requested from the chosen set of partitions and the collection of results returned from those partitions does not satisfy a search request in terms of the total number of rows needed for the result, the program may forego re-execution of the search with different parameters (i.e., a greater number of partitions or a greater number of rows to be returned from each partition) if it determines that the new search will likely not satisfy the search request. Under these circumstances, partial results may be returned.

A third execution path commences at block 317 where a third request is formulated that specifies performing a facet estimate for a faceted search, and that also specifies either sorting or no sorting. The facet estimate attempts to count the facets of the faceted search for a given sample to determine an estimated facet count. The estimated facet count may be determined using probabilistic computations that determine a facet sample size of matches that are required for estimating the facet. Using that sample, the facet counts for an entire index may be estimated. At block 343, a first limited list of partitions that are required for executing the search are determined. Also, the number or quantity of rows to return and fetch per partition is determined. A search against this first limited list of partitions is performed at block 345. A test is performed at block 347 to ascertain whether or not at least a minimum threshold number or quantity of rows exists for the result and at least a minimum threshold number or quantity of rows exists for the facet sample size. If both of the foregoing conditions of block 347 are met, the program progresses to block 349 where the facet estimate is performed. If either or both of the conditions of block 347 are not met, the program advances to block 351 where a re-estimate is performed of a total number or quantity of matches for each of a plurality of partitions (population and matches per partition).

At block 353, a second limited list of partitions that are required for executing the search are determined. Also, the number or quantity of rows to return and fetch per partition is determined. A search against this second limited list of partitions is performed at block 355. A test is performed at block 357 to ascertain whether or not at least a minimum threshold number or quantity of rows exists for the result and at least a minimum threshold number or quantity of rows exists for the facet sample size. If both of the foregoing conditions of block 357 are met, the program progresses to block 359 where the facet estimate is performed. If either or both of the conditions of block 357 are not met, the program advances to block 361 where a search is performed against any remaining partitions.

A fourth execution path commences at block 319 where a fourth request is formulated that specifies sorting and an exact faceted search, or sorting and no faceted search request. The fourth request represents a deterministic query that is performed on all partitions. The program proceeds to block 363 where a number or quantity of rows to return or fetch per partition is determined. At block 365, the search is executed against all partitions.

The following is an illustrative listing of configuration parameters in extensible markup language (XML) which may be used to implement any of the operational sequences described in conjunction with FIGS. 3A-3C:

```
dc_config.xml
<searchOptimization>
    <on>true/false</on>
    <levelOfConfidence>0.95 </levelOfConfidence>
    <marginOfError>0.05 </marginOfError>
    <total-count>estimate/exact/no</total-count>
```

```
        <facet>true/false</facet>
        <searchOptimizationOptionFetchBufferFactor>2</searchOptimization
OptionFetchBufferFactor>
        <SearchOptimizationOptionReturnBufferFactor>2</searchOptimizati
onOptionReturnBufferFactor>
        <minMatchCount>100</minMatchCount>
        <minMatchPortion>0.00001</minMatchPortion>
        <fetchMinMatchCount>100</fetchMinMatchCount>
        <fetchMinMatchPortion>0.00001</fetchMinMatchPortion>
</searchOptimization>
Tags description:
on :   true = optimization is on, false = no optimization
levelOfConfidence: float value - representing the level of confidence we use for the
sampling
marginOfError. float value - representing the marginOfError we allow
total-count: estimate = estimate the total-count
    exact = give the exact total-count, no estimation
    no= no total-count computation
facet: true= estimate the facet
    false = do not estimate the facet
searchOptimizationOptionFetchBufferFactor. int value, representing the buffer
factor for the query for the number of rows to fetch(2 means twice the cushion, or 100% buffer
required)
searchOptimizationOptionReturnBufferFactor. int value, representing the buffer
factor for the query for the number of rows to return(2 means twice the cushion, or 100% buffer
required)
minMatchCount = an integer number representing the minimum limit for the
estimated matching rows above which we will estimate. If we do not get to that limit, then we will
not estimate.
minMatchPortion = a float value representing the minimum limit for the estimated
matching rows, expressed as percentage from the index size, above which we will estimate.
fetchMinMatchCount = an integer number representing the minimum limit for the
estimated matching rows above which we will estimate. This will be used instead of
minMatchCount when facet is present.
fetchMinMatchPortion = a float value representing the minimum limit for the
estimated matching rows, expressed as percentage from the index size, above which we will
estimate. This is used instead of minMatchPortion when facet is present.
    (End of Program Listing)
```

In situations where optimization is to be performed, and the total-count and facet are set to not be estimated, then (depending, for example, on the query type, etc) it may be possible to optimize by minimizing the rows to return from each partition for aggregation, and if faceted searching is not specified, by minimizing the rows to fetch. In the decision of what and how to optimize the foregoing configuration parameters, factors such as the query type and whether or not sorting is specified, may be taken into consideration.

Regarding Total-Count: The API may be configured to allow an http header "TOTAL_MATCH_COUNT". This header may have any of the following values:

exact—the user requires the exact total count;

estimate—an estimate of the total count is acceptable to the user;

none—the user does not require the total count.

In situations where the performance of search optimization is allowed (i.e., turned on), the default total count taken is the count that is configured in the configuration file as indicated previously. If a search request contains a header (total_match_count), then the value of the header will be used. Optimization related parameters are only considered if the optimization is allowed (i.e., turned on), otherwise all of these parameters are ignored. For example, if the search optimization is turned off, and a search request contains the header "TOTAL_MATCH_COUNT" then the header is ignored.

Figure 3D:
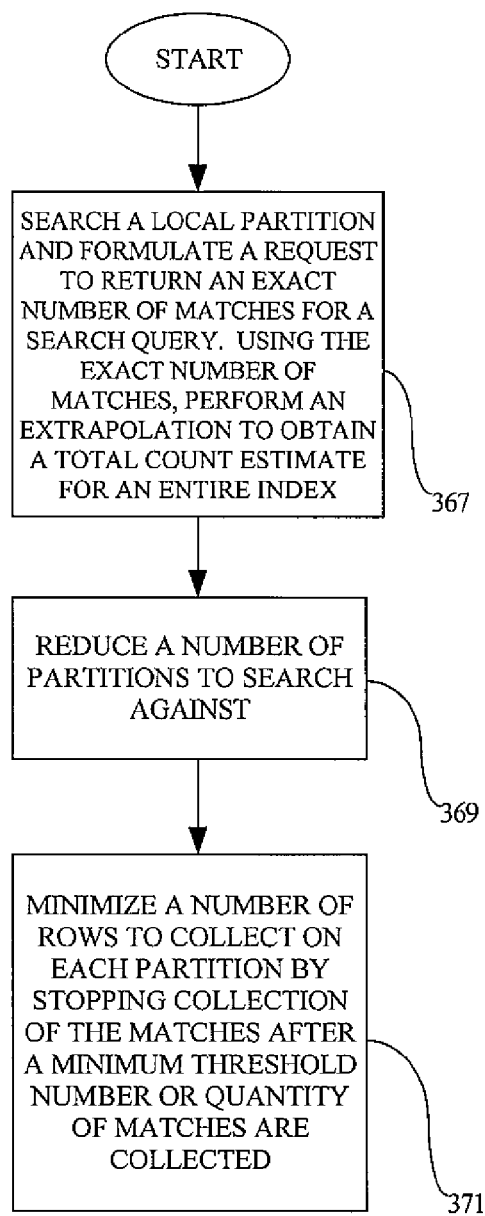
FIG. 3D comprises a flowchart of a second exemplary set of processes for performing index search optimization according to another set of embodiments.

FIG. 3D comprises a flowchart of a second exemplary set of processes for performing index search optimization of processes according to another set of embodiments. In this example we describe techniques used for TOTAL COUNT. One or more of the following procedures may be performed. At block 367, a local partition is searched and a request is formulated to return an exact number of matches for a search query. Using the exact number of matches from the local partition, an extrapolation is performed to obtain a total-count estimate for an entire index.

At block 369, a number of partitions to search against is reduced. If an exact total-count is desired, then a search would need to be performed against all partitions. However, by estimating the total-count, searching all partitions will not be a requirement from this perspective. Nonetheless, if a sorting request is present or if an exact facet is needed, then all partitions will need to be searched.

At block 371, a number of rows to collect on each partition is minimized by stopping collection of the matches after a minimum threshold quantity of matches are collected. For determining an exact total-count, one would need to collect everything on each partition.

The API for implementing a faceted search may be configured to allow an http header "FACET_COUNT". This header can have any of the following values:

exact—the user requires the exact FACET counts;

estimate—estimates of the FACET counts are acceptable for the user.

By estimating the facet, attempt to count the facet for a sample. Using that sample, estimate the facet counts for the entire index.

Figure 3E:
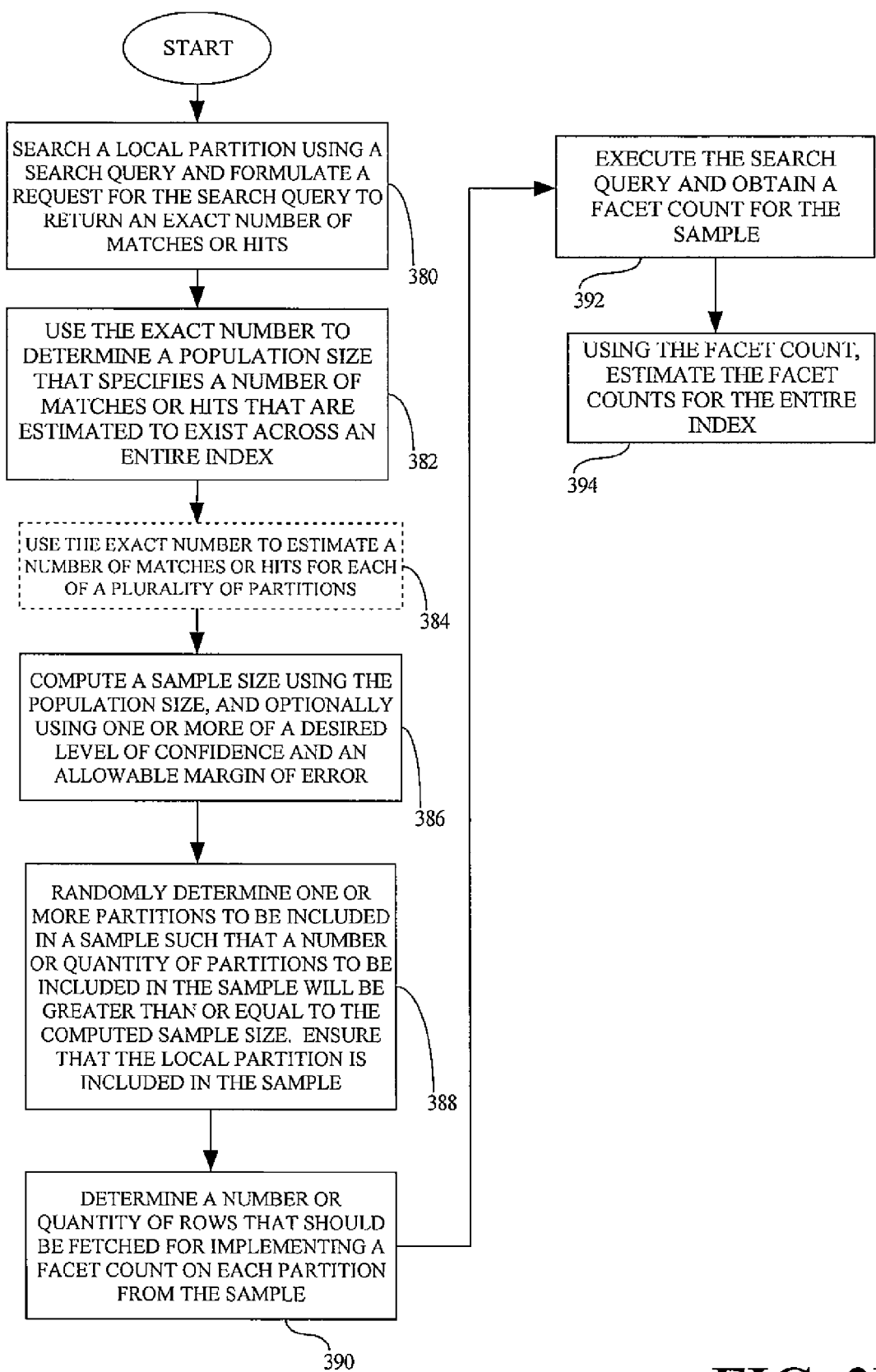
FIG. 3E comprises a flowchart of a third exemplary set of processes for performing index search optimization according to another set of embodiments.

FIG. 3E comprises a flowchart of a third exemplary set of processes for performing index search optimization according to another set of embodiments. In this example we describe techniques used for FACET COUNT. The operational sequence commences at block 380 where a local partition is searched using a search query and a request is formulated for the search query to return an exact number of matches or hits. Next, at block 382, using the exact number of matches from the local partition, a population size that specifies a number of matches or hits that are estimated to exist across an entire index is determined. Optionally, at block 384, the exact number is used to estimate a number of matches or hits for each of a plurality of partitions. Next, at block 386, a sample size is computed using the population size, and optionally using one or more of desired level of confidence and an allowable margin of error. The sample size represents a number or quantity of matches or hits for which it is desired to count one or more facets. One or more partitions to be included in a sample is randomly determined (block 388), such that a number or quantity of partitions to be included in the sample will be greater than or equal to the computed sample size. Ensure that the local partition is included in the sample. A number or quantity of rows that should be fetched for implementing a facet count on each partition from the sample is determined (block 390). The search query is executed, and a facet count is obtained for the sample (block 392). Using that facet count, the facet counts are estimated for the entire index (block 394).

The operational sequence of FIG. 3E reduces the number of partitions to run the search against. If an exact facet is needed, then everything should be counted. The operational sequence of FIG. 3E also minimizes the number of documents to be fetched. Only the documents we want to return need to be fetched. For exact facet we would have to fetch everything such that we would be able to count the values.

Figure 4:
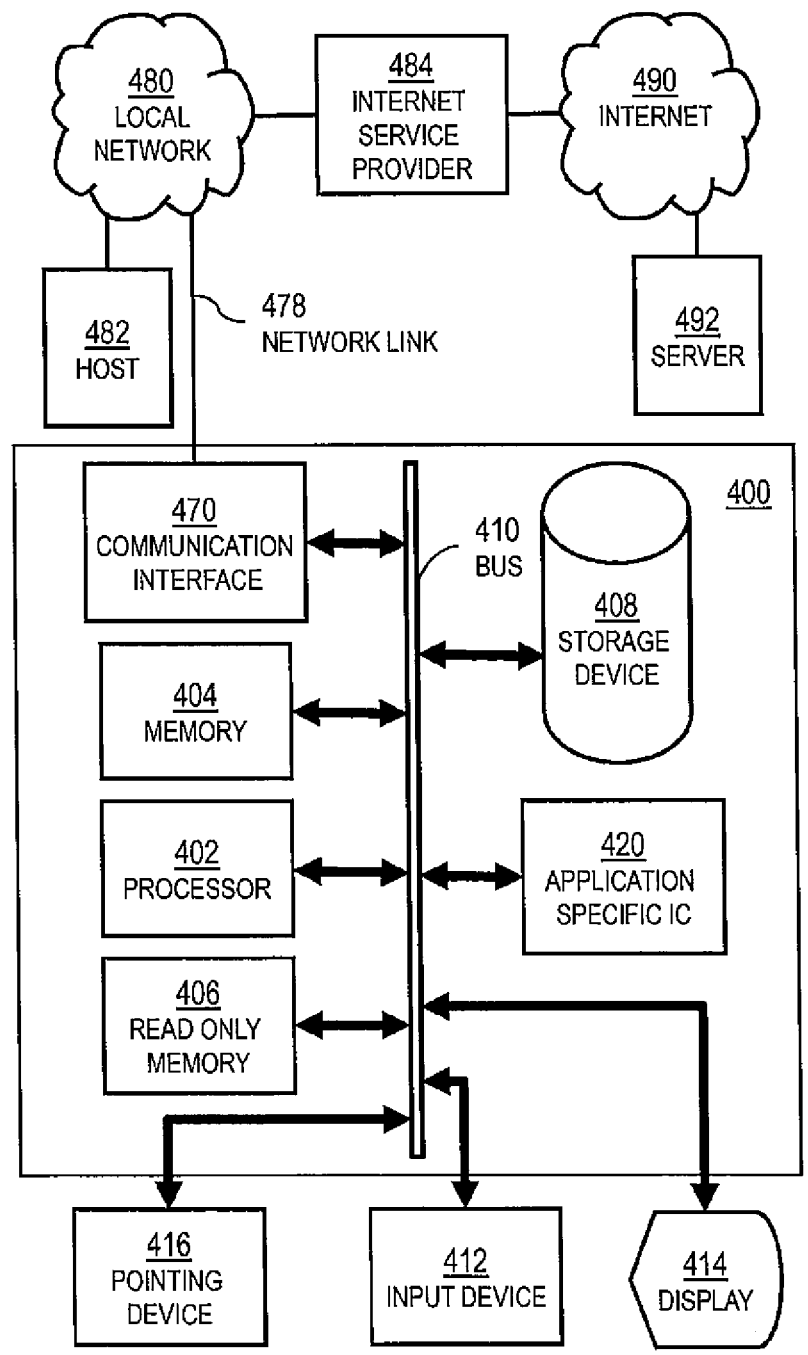
FIG. 4 is a diagram of hardware that can be used to implement an embodiment of the invention.
Figure 5:
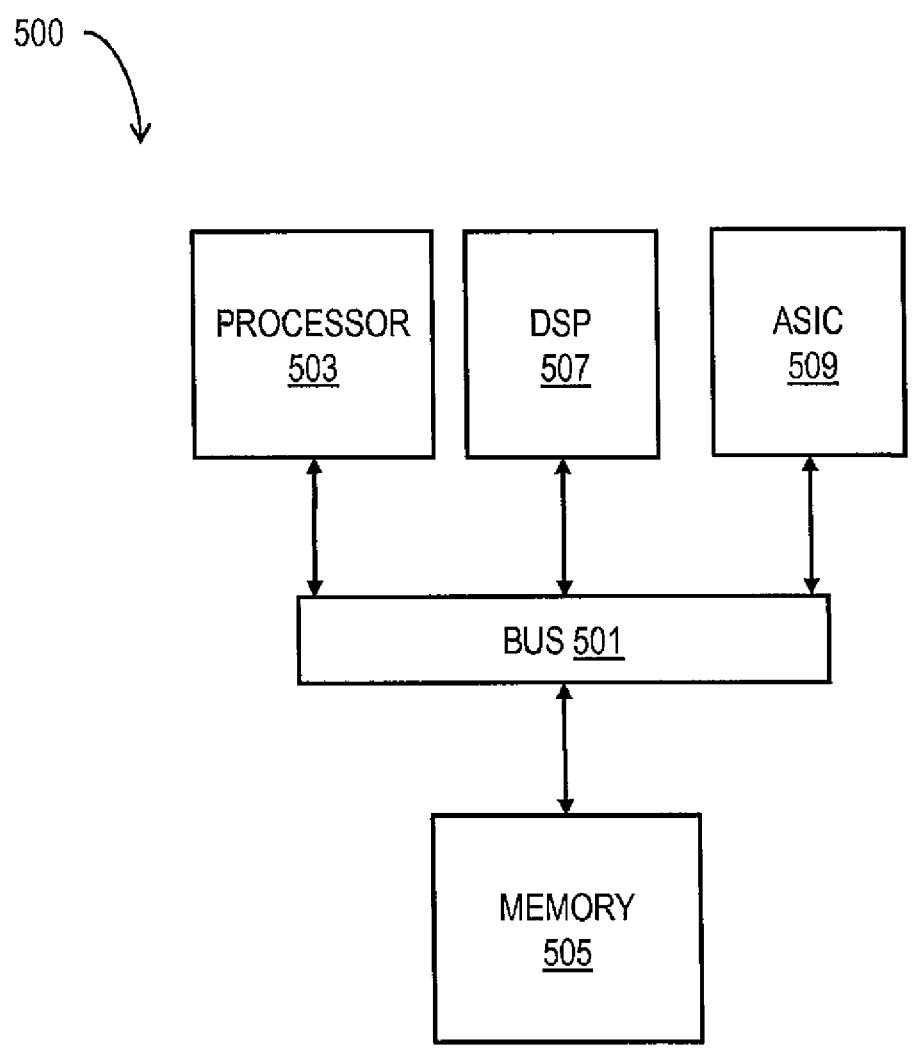
FIG. 5 is a diagram of a chip set that can be used to implement an embodiment of the invention.

In one set of illustrative embodiment, the enhanced node request module 152 (FIG. 1B) performs any of the processes illustrated in FIGS. 3A-3E. The enhanced node request module 152 and is implemented in, for instance, a chip set including a processor and a memory as shown in FIG. 5 or general purpose computer 400 as depicted in FIG. 4. In some embodiments, one or more steps involving updating or retrieving statistics from the request category statistics data structure 156 involve the request category statistics module 154 on the index service 120. Although steps are depicted in FIGS. 3A-3F as integral blocks in a particular order for purposes of illustration, in other embodiments one or more steps or portions thereof are performed in a different order, or overlapping in time, in series or in parallel, or are omitted or one or more steps are added, or the process is changed in some combination of ways.

The processes described herein for processing of search requests directed to a partitioned index may be advantageously implemented via software, hardware, firmware or a combination of software and/or firmware and/or hardware. For example, the processes described herein may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 4 illustrates a computer system 400 upon which an embodiment of the invention may be implemented. Although computer system 400 is depicted with respect to a particular device or equipment, it is contemplated that other devices or equipment (e.g., network elements, servers, etc.) within FIG. 4 can deploy the illustrated hardware and components of system 400. Computer system 400 is programmed (e.g., via computer program code or instructions) to process search requests directed to a partitioned index as described herein and includes a communication mechanism such as a bus 410 for passing information between other internal and external components of the computer system 400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 400, or a portion thereof, constitutes a means for performing one or more steps of processing of search requests directed to a partitioned index.

A bus 410 includes one or more parallel conductors of information so that information is transferred quickly among devices coupled to the bus 410. One or more processors 402 for processing information are coupled with the bus 410.

A processor (or multiple processors) 402 performs a set of operations on information as specified by computer program code related to processing of search requests directed to a partitioned index. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 410 and placing information on the bus 410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 400 also includes a memory 404 coupled to bus 410. The memory 404, such as a random access memory (RAM) or other dynamic storage device, stores information including processor instructions for processing of search requests directed to a partitioned index. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of processor instructions. The computer system 400 also includes a read only memory (ROM) 406 or other static storage device coupled to the bus 410 for storing static information, including instructions, that is not changed by the computer system 400. Some memory is composed of volatile storage that loses the information stored thereon when power is lost. Also coupled to bus 410 is a non-volatile (persistent) storage device 408, such as a magnetic disk, optical disk or flash card, for storing information, including instructions, that persists even when the computer system 400 is turned off or otherwise loses power.

Information, including instructions for processing of search requests directed to a partitioned index, is provided to the bus 410 for use by the processor from an external input device 412, such as a keyboard containing alphanumeric keys operated by a human user, or a sensor. A sensor detects conditions in its vicinity and transforms those detections into physical expression compatible with the measurable phenomenon used to represent information in computer system 400. Other external devices coupled to bus 410, used primarily for interacting with humans, include a display device 414, such as a cathode ray tube (CRT) or a liquid crystal display (LCD), or plasma screen or printer for presenting text or images, and a pointing device 416, such as a mouse or a trackball or cursor direction keys, or motion sensor, for controlling a position of a small cursor image presented on the display 414 and issuing commands associated with graphical elements presented on the display 414. In some embodiments, for example, in embodiments in which the computer system 400 performs all functions automatically without human input, one or more of external input device 412, display device 414 and pointing device 416 is omitted.

In the illustrated embodiment, special purpose hardware, such as an application specific integrated circuit (ASIC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a one-way or two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends or receives or both sends and receives electrical, acoustic or electromagnetic signals, including infrared and optical signals, that carry information streams, such as digital data. For example, in wireless handheld devices, such as mobile telephones like cell phones, the communications interface 470 includes a radio band electromagnetic transmitter and receiver called a radio transceiver. In certain embodiments, the communications interface 470 enables connection to the communication network 105 for processing of search requests directed to a partitioned index to the UE 101.

The term "computer-readable medium" as used herein refers to any medium that participates in providing information to processor 402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 408. Volatile media include, for example, dynamic memory 404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 420.

Network link 478 typically provides information communication using transmission media through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490.

A computer called a server host 492 connected to the Internet hosts a process that provides a service in response to information received over the Internet. For example, server host 492 hosts a process that provides information representing video data for presentation at display 414. It is contemplated that the components of system 400 can be deployed in various configurations within other computer systems, e.g., host 482 and server 492.

At least some embodiments of the invention are related to the use of computer system 400 for implementing some or all of the techniques described herein. According to one embodiment of the invention, those techniques are performed by computer system 400 in response to processor 402 executing one or more sequences of one or more processor instructions contained in memory 404. Such instructions, also called computer instructions, software and program code, may be read into memory 404 from another computer-readable medium such as storage device 408 or network link 478. Execution of the sequences of instructions contained in memory 404 causes processor 402 to perform one or more of the method steps described herein. In alternative embodiments, hardware, such as ASIC 420, may be used in place of or in combination with software to implement the invention. Thus, embodiments of the invention are not limited to any specific combination of hardware and software, unless otherwise explicitly stated herein.

The signals transmitted over network link 478 and other networks through communications interface 470, carry information to and from computer system 400. Computer system 400 can send and receive information, including program code, through the networks 480, 490 among others, through network link 478 and communications interface 470. In an example using the Internet 490, a server host 492 transmits program code for a particular application, requested by a message sent from computer 400, through Internet 490, ISP equipment 484, local network 480 and communications interface 470. The received code may be executed by processor 402 as it is received, or may be stored in memory 404 or in storage device 408 or other non-volatile storage for later execution, or both. In this manner, computer system 400 may obtain application program code in the form of signals on a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to a signal on an infra-red carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

FIG. 5 illustrates a chip set or chip 500 upon which an embodiment of the invention may be implemented. Chip set 500 is programmed to process search requests directed to a partitioned index as described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 500 can be implemented in a single chip. It is further contemplated that in certain embodiments the chip set or chip 500 can be implemented as a single "system on a chip." It is further contemplated that in certain embodiments a separate ASIC would not be used, for example, and that all relevant functions as disclosed herein would be performed by a processor or processors. Chip set or chip 500, or a portion thereof, constitutes a means for performing one or more steps of providing user interface navigation information associated with the availability of functions. Chip set or chip 500, or a portion thereof, constitutes a means for performing one or more steps of processing of search requests directed to a partitioned index.

In one embodiment, the chip set or chip 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 500 includes merely one or more processors and some software and/or firmware supporting and/or relating to and/or for the one or more processors.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform the inventive steps described herein to process search requests directed to a partitioned index. The memory 505 also stores the data associated with or generated by the execution of the inventive steps.

FIG. 6 is a diagram of exemplary components of a mobile terminal (e.g., handset) for communications, which is capable of operating in the system of FIG. 1, according to one embodiment. In some embodiments, mobile terminal 601, or a portion thereof, constitutes a means for performing one or more steps of processing of search requests directed to a partitioned index. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 603, a Digital Signal Processor (DSP) 605, and a receiver/transmitter unit including a microphone gain control unit and a speaker gain control unit. A main display unit 607 provides a display to the user in support of various applications and mobile terminal functions that perform or support the steps of processing of search requests directed to a partitioned index. The display 607 includes display circuitry configured to display at least a portion of a user interface of the mobile terminal (e.g., mobile telephone). Additionally, the display 607 and display circuitry are configured to facilitate user control of at least some functions of the mobile terminal. An audio function circuitry 609 includes a microphone 611 and microphone amplifier that amplifies the speech signal output from the microphone 611. The amplified speech signal output from the microphone 611 is fed to a coder/decoder (CODEC) 613.

A radio section 615 amplifies power and converts frequency in order to communicate with a base station, which is included in a mobile communication system, via antenna 617. The power amplifier (PA) 619 and the transmitter/modulation circuitry are operationally responsive to the MCU 603, with an output from the PA 619 coupled to the duplexer 621 or circulator or antenna switch, as known in the art. The PA 619 also couples to a battery interface and power control unit 620.

In use, a user of mobile terminal 601 speaks into the microphone 611 and his or her voice along with any detected background noise is converted into an analog voltage. The analog voltage is then converted into a digital signal through the Analog to Digital Converter (ADC) 623. The control unit 603 routes the digital signal into the DSP 605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 625 for compensation of any frequency-dependent impairments that occur during transmission though the air such as phase and amplitude distortion. After equalizing the bit stream, the modulator 627 combines the signal with a RF signal generated in the RF interface 629. The modulator 627 generates a sine wave by way of frequency or phase modulation. In order to prepare the signal for transmission, an up-converter 631 combines the sine wave output from the modulator 627 with another sine wave generated by a synthesizer 633 to achieve the desired frequency of transmission. The signal is then sent through a PA 619 to increase the signal to an appropriate power level. In practical systems, the PA 619 acts as a variable gain amplifier whose gain is controlled by the DSP 605 from information received from a network base station. The signal is then filtered within the duplexer 621 and optionally sent to an antenna coupler 635 to match impedances to provide maximum power transfer. Finally, the signal is transmitted via antenna 617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 601 are received via antenna 617 and immediately amplified by a low noise amplifier (LNA) 637. A down-converter 639 lowers the carrier frequency while the demodulator 641 strips away the RF leaving only a digital bit stream. The signal then goes through the equalizer 625 and is processed by the DSP 605. A Digital to Analog Converter (DAC) 643 converts the signal and the resulting output is transmitted to the user through the speaker 645, all under control of a Main Control Unit (MCU) 603—which can be implemented as a Central Processing Unit (CPU) (not shown).

The MCU 603 receives various signals including input signals from the keyboard 647. The keyboard 647 and/or the MCU 603 in combination with other user input components (e.g., the microphone 611) comprise a user interface circuitry for managing user input. The MCU 603 runs a user interface software to facilitate user control of at least some functions of the mobile terminal 601 to process search requests directed to a partitioned index. The MCU 603 also delivers a display command and a switch command to the display 607 and to the speech output switching controller, respectively. Further, the MCU 603 exchanges information with the DSP 605 and can access an optionally incorporated SIM card 649 and a memory 651. In addition, the MCU 603 executes various control functions required of the terminal. The DSP 605 may, depending upon the implementation, perform any of a variety of conventional digital processing functions on the voice signals. Additionally, DSP 605 determines the background noise level of the local environment from the signals detected by microphone 611 and sets the gain of microphone 611 to a level selected to compensate for the natural tendency of the user of the mobile terminal 601.

The CODEC 613 includes the ADC 623 and DAC 643. The memory 651 stores various data including call incoming tone data and is capable of storing other data including music data received via, e.g., the global Internet. The software module could reside in RAM memory, flash memory, registers, or any other form of writable storage medium known in the art. The memory device 651 may be, but not limited to, a single memory, CD, DVD, ROM, RAM, EEPROM, optical storage, or any other non-volatile storage medium capable of storing digital data.

An optionally incorporated SIM card 649 carries, for instance, important information, such as the cellular phone number, the carrier supplying service, subscription details, and security information. The SIM card 649 serves primarily to identify the mobile terminal 601 on a radio network. The card 649 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

Operations of the flowcharts of FIGS. 3A-3E, and combinations of operations in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowcharts. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods of FIGS. 3A-3E are described with help of apparatus 200. However, the operations of the methods can be described and/or practiced by using any other apparatus.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

We claim:

1. A method comprising:
receiving, at a processor, a search query for a search of an index, wherein the index is a data structure having at least one field that can be searched, wherein the index has been partitioned across a plurality of nodes;
in response to determining, by the processor, that the search query is deterministic, performing the search on a plurality of partitions of the index;
in response to determining, by the processor, that the search query is not deterministic, performing the search only within a memory of local partition to identify a first quantity of matches for the search; and
in response to determining that the first quantity satisfies a predetermined threshold, estimating a second quantity of matches for one or more partitions other than and not including the local partition, and selecting an execution path for reducing query execution time.

2. The method of claim 1 wherein the request is determined to be deterministic in response to no more than a predetermined number of sets of index entries at least substantively satisfying the request.

3. The method of claim 2 wherein the request is determined to be deterministic if only one set of index entries substantively satisfies the request.

4. The method of claim 1 further comprising formulating a first request for a first execution path that specifies no sorting, no faceted searching, and a determination of an exact quantity of matches for the search.

5. The method of claim 4 further comprising formulating a second request for a second execution path that specifies no sorting, no faceted searching, and an estimation of a total quantity of matches for the search.

6. The method of claim 5 further comprising formulating a third request for a third execution path that specifies performance of a facet estimate and either sort or no sort.

7. The method of claim 6 further comprising formulating a fourth request for a fourth execution path that specifies sorting and an exact faceted search, or sorting and no faceted search.

8. The method of claim 1, wherein estimating a second quantity of matches for one or more partitions other than and not including the local partition comprises:
formulating, using the processor, a query to run against the one or more partitions other than and not including the local partition.

9. An apparatus comprising at least one processor, and at least one memory including computer program code, the at least one memory and the computer program code configured, with the at least one processor, to cause, at least in part, the apparatus to:
receive a search query for a search of an index, wherein the index has been partitioned across a plurality of nodes;
in response to determining that the search query is deterministic, perform the search on a plurality of partitions of the index;
in response to determining that the search query is not deterministic, perform the search within a local partition to identify a first quantity of matches for the search; and in response to determining that the first quantity satisfies a predetermined threshold, estimate a second quantity of matches for one or more partitions other than and not including the local partition, and select an execution path for reducing query execution time.

10. The apparatus of claim 9 wherein the request is determined to be deterministic in response to no more than a predetermined number of sets of index entries at least substantively satisfying the request.

11. The apparatus of claim 10 wherein only one set of index entries substantively satisfies the request.

12. The apparatus of claim 9 wherein the at least one memory and the computer program code are further configured, with the at least one processor, to cause, at least in part, the apparatus to formulate a first request for a first execution path that specifies no sorting, no faceted searching, and a determination of an exact quantity of matches for the search.

13. The apparatus of claim 12 wherein the at least one memory and the computer program code are further configured, with the at least one processor, to cause, at least in part, the apparatus to formulate a second request for a second execution path that specifies no sorting, no faceted searching, and an estimation of a total quantity of matches for the search.

14. The apparatus of claim 13 wherein the at least one memory and the computer program code are further configured, with the at least one processor, to cause, at least in part, the apparatus to formulate a third request for a third execution path that specifies performance of a facet estimate and either sort or no sort.

15. The apparatus of claim 14 wherein the at least one memory and the computer program code are further configured, with the at least one processor, to cause, at least in part, the apparatus to formulate a fourth request for a fourth execution path that specifies sorting and an exact faceted search, or sorting and no faceted search.

16. A computer program product comprising at least one non-transitory computer-readable storage medium carrying one or more sequences of one or more instructions which, when executed by one or more processors, cause, at least in part, an apparatus to:

receive a search query for a search of an index, wherein the index has been partitioned across a plurality of nodes;

in response to determining that the search query is deterministic, perform the search on a plurality of partitions of the index;

in response to determining that the search query is not deterministic, perform the search within a local partition to identify a first quantity of matches for the search; and in response to determining that the first quantity satisfies a predetermined threshold, estimate a second quantity of matches for one or more partitions other than and not including the local partition, and select an execution path for reducing query execution time.

17. The computer-readable storage medium of claim 16 further carrying instructions for determining that the request is deterministic in response to no more than a predetermined number of sets of index entries at least substantively satisfying the request.

18. The computer-readable storage medium of claim 17 further carrying instructions such that only one set of index entries substantively satisfies the request.

19. The computer-readable storage medium of claim 16 further carrying instructions for formulating a first request for a first execution path that specifies no sorting, no faceted searching, and a determination of an exact quantity of matches for the search.

20. The computer-readable storage medium of claim 19 further carrying instructions for formulating a second request for a second execution path that specifies no sorting, no faceted searching, and an estimation of a total quantity of matches for the search.

21. The computer-readable storage medium of claim 20 further carrying instructions for formulating a third request for a third execution path that specifies performance of a facet estimate and either sort or no sort.

22. The computer-readable storage medium of claim 21 further carrying instructions for formulating a fourth request for a fourth execution path that specifies sorting and an exact faceted search, or sorting and no faceted search.

* * * * *